United States Patent [19]

Miura et al.

[11] Patent Number: 4,959,172
[45] Date of Patent: Sep. 25, 1990

[54] LIQUID CRYSTAL COMPOSITION CONTAINING A PLEOCHROIC AZO TYPE COMPOUND

[75] Inventors: Konoe Miura, Yokohama; Tetsuo Ozawa, Hadano; Keiko Yoneyama, Machida, all of Japan

[73] Assignee: Mitsubishi Kasei Corporation, Tokyo, Japan

[21] Appl. No.: 201,528

[22] Filed: Jun. 2, 1988

[30] Foreign Application Priority Data

Jun. 4, 1987 [JP] Japan .................. 62-140584
Oct. 19, 1987 [JP] Japan .................. 62-263563

[51] Int. Cl.$^5$ ............................................. C09K 19/00
[52] U.S. Cl. .................. 252/299.1; 350/349; 534/577; 534/752
[58] Field of Search ............. 252/299.1; 350/349; 534/577, 752

[56] References Cited

U.S. PATENT DOCUMENTS 4,668,050 5/1987 Aoki et al. ................ 252/299.1

FOREIGN PATENT DOCUMENTS 58-38756 3/1983 Japan .
60-228568 11/1985 Japan .

*Primary Examiner*—Matthew A. Thexton
*Assistant Examiner*—Richard Treanor
*Attorney, Agent, or Firm*—Jordan B. Bierman

[57] ABSTRACT

A liquid crystal composition suitable for a guest-host liquid crystal device and the composition comprises a solution of a liquid crystal substance and a pleochroic dye which comprises at least one azo type compound having the formula (I),

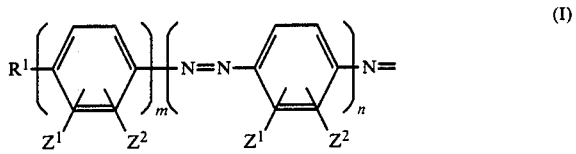

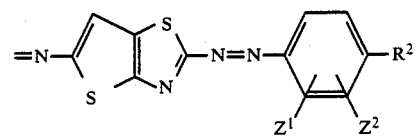

wherein $R^1$ represents a hydrogen atom, an alkyl group or an alkoxy group each of which may be substituted by an alkoxy or an aryl group; a cyclohexyl group which may be substituted by an alkyl group; or —COOR$^3$ (wherein $R^3$ represents an alkyl group which may be substituted by an alkoxy group, a cyclohexyl group which may be substituted by an alkyl group, or an aryl group which may be substituted by an alkoxy or an alkyl group);
$R_2$ represents

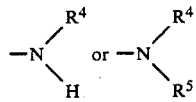

where $R^4$ and $R^5$ each represents an alkyl group which may be substituted by an alkoxy or an aryl group; or $R^4$ and $R^5$ may be connected to each other to form a ring; $Z^1$ and $Z^2$ each represents a hydrogen atom, a halogen atom, and alkyl group or an alkoxy group, or $Z^1$ and $Z^2$ may be connected to each other to form a carbocyclic ring or a nitrogenous heterocyclic ring;
m is 1 or 2; and
n is 0 or 1.

13 Claims, No Drawings

LIQUID CRYSTAL COMPOSITION CONTAINING A PLEOCHROIC AZO TYPE COMPOUND

FIELD OF THE INVENTION

This invention relates to a guest-host liquid crystal composition containing a pleochroic azo type compound.

BACKGROUND OF THE INVENTION

There has so far been known to effect color display in utilization of the guest-host effect between a dye and liquid crystal by interposing between a pair of mutually opposing electrodes a liquid crystal composition prepared by dissolving a dye into liquid crystal.

The dye to be used for such liquid crystal composition is required to have, among other things, high dichroic ratio, high solubility to the liquid crystal, and other properties.

However, these conventionally known azo type compounds did not always satisfy the properties which are required of the dye to be used in the liquid crystal composition as mentioned above.

SUMMARY OF THE INVENTION

The object of this invention is, therefore to provide guest-host liquid crystal compositions comprising an azo type compound satisfying the above-described factors.

With a view to attaining such objective, the present inventors conducted repeated studies and researches, as the result of which they have come to a finding that, the azo type compounds which are represented by the following formula (I), exhibit high dichroic ratio and good solubility to liquid crystal, and that liquid crystal compositions containing such dye perform satisfactory color display. Based on this finding, they have arrived at the present invention.

Therefore, this invention has its gist in providing liquid crystal compositions containing azo type compounds, which are represented by the following formula (I),

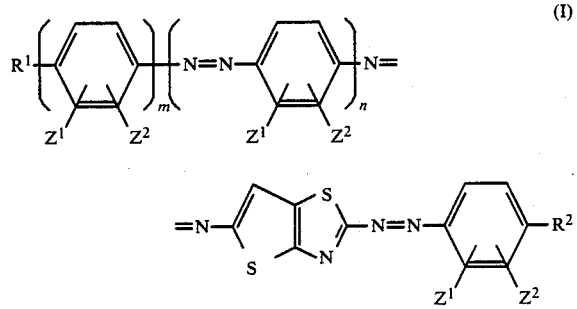

wherein $R^1$ represents a hydrogen atom, an alkyl group which may be substituted by an alkoxy or aryl group, an alkoxy group which may be substituted by an alkoxy or aryl group, a cyclohexyl group which may be substituted by an alkyl group, or $R^3OOC-$ (where $R^3$ represents an alkyl group which may be substituted by an alkoxy group, a cyclohexyl group which may be substituted by an alkyl group, or an aryl group which may be substituted by an alkoxy or alkyl group); $R_2$ represents

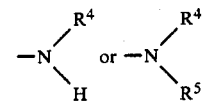

(where $R^4$ and $R^5$ each represents an alkyl group which may be substituted by an alkoxy or aryl group, and $R^4$ and $R^5$ optionally connect each other to form a ring); $Z^1$ and $Z^2$ each represents a hydrogen atom, a halogen atom, an alkyl group or an alkoxy group and may connect each other to form a carbocyclic ring or a nitrogenous heterocyclic ring; m represents 1 or 2; and n represents 0 or 1).

DETAILED DESCRIPTION OF THE INVENTION

Then the invention is explained in detail.

First, the azo type dyes shown by formula (I) described above are explained.

In the azo type compounds represented by the general formula (I) in the present invention, $R^1$ may be selected from among the following: a hydrogen atom; a linear or branched alkyl group (preferably an alkyl group having 1 to 8 carbon atoms); a linear or branched alkoxy group (preferably an alkoxy group having 1 to 8 carbon atoms); an alkyl group (preferably an alkyl group having 1 to 8 carbon atoms) and an alkoxy group (preferably an alkoxy group having 1 to 8 carbon atoms) which are substituted by an alkoxy group (preferably an alkoxy group having 1 to 8 carbon atoms); an alkyl group (preferably an alkyl group having 1 to 3 carbon atoms) and an alkoxy group (preferably an alkyl group having 1 to 3 carbon atoms) which are substituted by an aryl group such as a phenyl group which may be substituted by an alkyl group having 1 to 8 carbon atoms, an alkoxy group having 1 to 8 carbon atoms or a halogen atom such as a chlorine atom; a cyclohexyl group which may be substituted by an alkyl group having 1 to 8 carbon atoms; and $-COOR^3$ [where $R^3$ is an alkyl group (preferably an alkyl group having 1 to 8 carbon atoms) which may be substituted by an alkoxy group (preferably an alkoxy group having 1 to 8·carbon atoms), a cyclohexyl group which may be substituted by an alkyl group (preferably an alkyl group having 1 to 8 carbon atoms), or an aryl group such as a phenyl or naphthyl group which may be substituted by an alkyl group (preferably an alkyl group having 1 to 8 carbon atoms) or an alkoxy group (preferably an alkoxy group having 1 to 8 carbon atoms)].

In the general formula (I), substituents $R^4$ and $R^5$ each represents an alkyl group which may be substituted by an alkoxy or aryl group and each of them may be exemplified by the following: an alkyl group having 1 to 8 carbon atoms; an alkyl group having 1 to 3 carbon atoms which is substituted by an alkoxy group having 1 to 8 carbon atoms; and an alkyl group having 1 to 3 carbon atoms which is substituted by

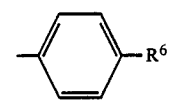

(where $R^6$ is a hydrogen atom, an alkyl group having 1 to 8 carbon atoms, an alkoxy group, or a halogen atom such as a chlorine atom). If desired, $R^4$ and $R^5$ may connect each other to form a nitrogenous heterocyclic ring such as a piperidine ring, a pyrrolidine ring, a piperazine ring, or a morpholine ring.

In formula (I), substituents $Z^1$ and $Z^2$ each represents a hydrogen atom, an alkyl group such as an alkyl group having 1 to 3 carbon atoms, an alkoxy group such as an alkoxy group having 1 to 3 carbon atoms, or a halogen atom such as a chlorine atom; $Z^1$ and $Z^2$ may connect each other to form a carbocyclic ring such as a benzene ring, a cyclohexane ring or a nitrogenous heterocyclic ring such as a pyridine ring.

The azo type compounds suitable for use in the present invention may be illustrated by:

(i) azo type compounds of the following general formula (II) where n=1 in formula (I):

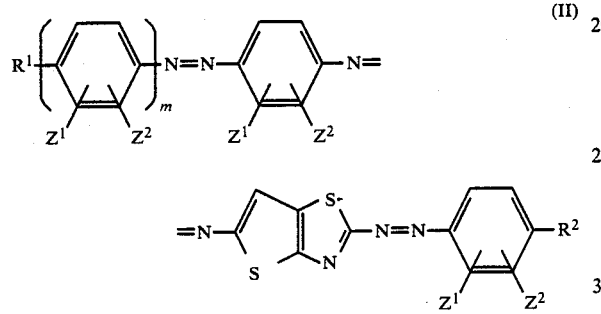

[where $R^1$, $R^2$, $Z^1$, $Z^2$ and m are the same as defined in formula (I)]; and (ii) azo type compounds of the following general formula (III) where n=0 in formula (I):

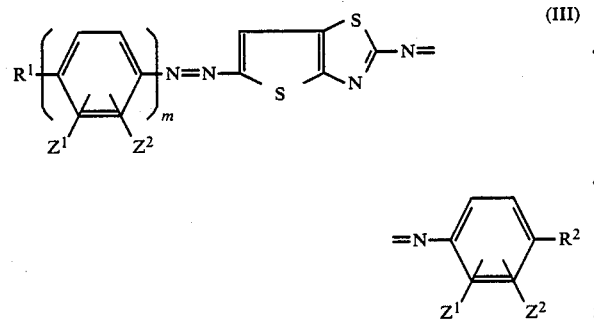

[where $R^1$, $R^2$, $Z^1$, $Z^2$ and m are the same as defined in formula (I)].

Azo type compounds that are particularly suitable for use in the liquid crystal composition of the present invention are described hereinafter.

Among the azo type compounds represented by the general formula (I), particularly preferred are those which are represented by the following general formula (IV):

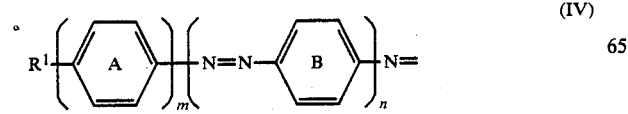

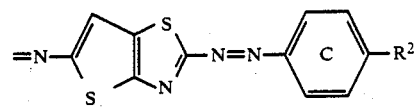

wherein $R^1$ has the same meaning as defined in formula (I) and is preferably selected from among: (i) an alkyl group optionally substituted by an alkoxy or aryl group; (ii) an alkoxy group optionally substituted by an alkoxy or aryl group; (iii) a cyclohexyl group optionally substituted by an alkyl group. Preferably, $R^1$ is (i) or (iii), the former being an alkyl group which may be substituted by an aryl group. An alkyl group or a 4-alkylcyclohexyl group is particularly preferred as $R^1$.

While $R^2$ has the same meaning as defined in formula (I), it is preferably

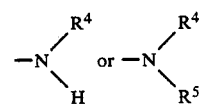

(where $R^4$ and $R^5$ each represents an alkyl group which may be represented by an alkoxy or aryl group). More preferably, $R^2$ represents

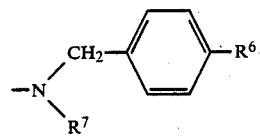

(where $R^7$ is a hydrogen atom or an alkyl group, and $R^6$ is a hydrogen atom, an alkyl group or an alkoxy group) or

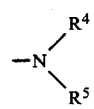

(where $R^4$ and $R^5$ each represents an alkyl group which may be substituted by an alkoxy group), with $R^4$ and $R^5$ being preferably an alkyl group.

More preferably, $R^2$ is represented by

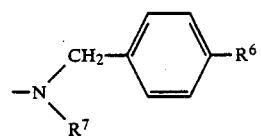

(where $R^6$ represents an alkyl group or an alkoxy group) or

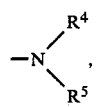

the former being particularly preferred.

In formula (IV),

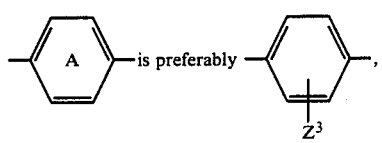is preferably 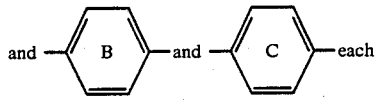

and 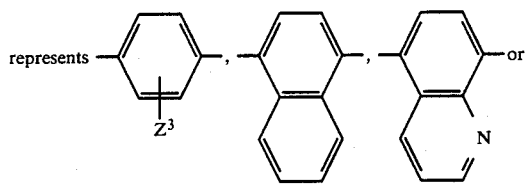 each represents 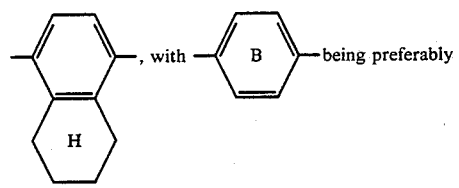, with 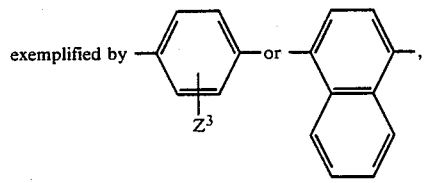 being preferably exemplified by 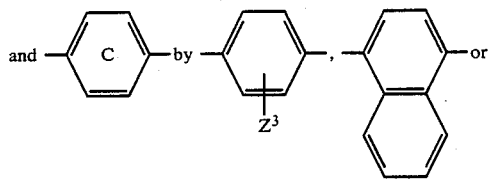, and 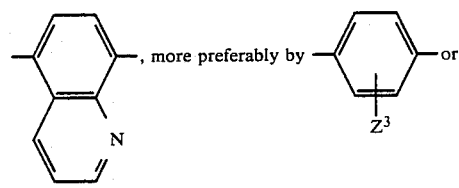, more preferably by 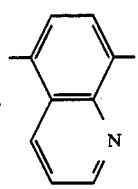

A particularly preferred case is where each of 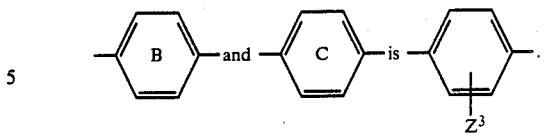 and 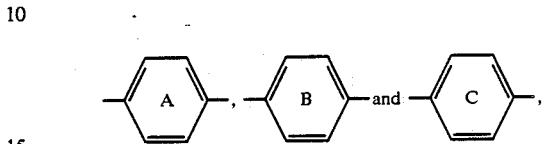 is

In the above-illustrated examples of

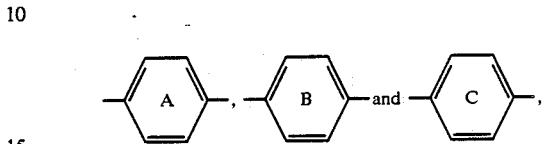

$Z^3$ represents a hydrogen atom or an alkyl group, with a hydrogen atom or a methyl group being preferred.

In formula (IV), m represents a number of 1 or 2, and n represents a number of 0 or 1. When m is 1, $R^1$ preferably represents an alkyl group or a 4-alkylcyclohexyl group, and when m is 2, $R^1$ preferably represents an alkyl group. From a practical viewpoint, compounds where n=1 are preferred over those where n=0.

The azo type compounds represented by the general formula (II) may be prepared as follows in accordance with the method described in Japanese Patent Laid-Open No. 38756/83:

diazotizing a monoazo compound represented by the general formula (V):

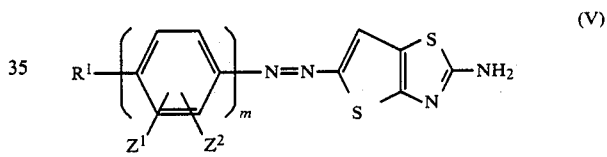 (V)

wherein $R^1$, m, $Z^1$ and $Z^2$ have the same meanings as defined in the general formula (II); and coupling the resulting diazo compound with an aniline represented by the general formula (VI):

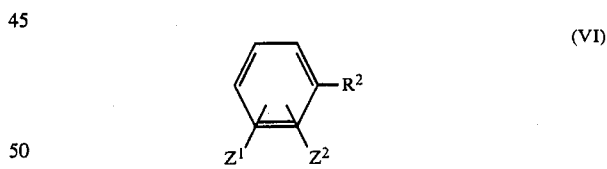 (VI)

where $R^2$ and

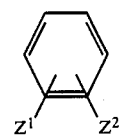

have the same meanings as defined in the general formula (II).

The azo type compounds represented by the general formula (III) may be prepared by the same procedures as above except that the compound of formula (V) is replaced with the compound represented by the following general formula (VII):

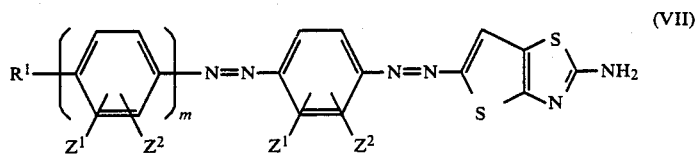

(VII)

where $R^1$, $Z^1$, $Z^2$ and m have the same meanings as defined in formula (III).

The liquid crystal composition of the present invention contains the compound of formula (I) in an amount ranging from 0.01 to 10 wt%, preferably from 0.05 to 3 wt%, of the liquid crystal substance.

The liquid crystal composition of the present invention is a compound that is to be used in guest-host type liquid-crystal displays. The term "guest-host type" means the incorporation of a dichroic dye (guest) in a liquid-crystal host. Examples of the guest-host type display include a twisted nematic type (TN) display method, a heat writing (HW) display method, and a guest-host display method employing or not employing a polarizing film.

While various liquid crystals may be used in the liquid crystal composition of the present invention, typical examples include nematic liquid crystals, smectic liquid crystals (e.g. ferroelectric liquid crystals such as smectic A and chiral smectic C structures), cholesteric liquid crystals, and polymer liquid crystals.

The nematic liquid crystal to be used for the liquid crystal composition according to the present invention may be selected from fairly broad varieties, provided that they are able to exhibit the nematic state within a range of their operating temperatures. It may also be possible that such a nematic liquid crystal is caused to assume the cholesteric state by addition thereto of an optically active substance to be described later. As the nematic liquid crystal, there may be exemplified those substances as shown in No. 1 to No. 3 of the following Table 1 or their derivatives.

TABLE 1

| No. | Type of Liquid Crystal | Example |
|---|---|---|
| 1 | Cyclohexylcyclohexane type | $R^a$—(H)—(H)—X |
| 2 | Phenylcyclohexane type | $R^a$—(H)—(Ph)—X |
| 3 | Biphenyl type | $R^a$—(Ph)—(Ph)—X |
| 4 | Terphenyl type | $R^a$—(Ph)—(Ph)—(Ph)—X |
| 5 | Cyclohexylcyclohexanate type | $R^a$—(H)—COO—(H)—X |
| 6 | Phenylcyclohexyl-carboxylate type | $R^a$—(H)—COO—(Ph)—X |
| 7 | Ester type | $R^a$—(Ph)—COO—(Ph)—X |
| 8 | Diester type | $R^a$—(Ph)—COO—(Ph)—COO—(Ph)—X |

TABLE 1-continued

| No. | Type of Liquid Crystal | Example |
|---|---|---|
| | | X—⌬—COO—⌬—COO—⌬—R$^a$ |
| 9 | Biphenyl cyclohexyl carboxylate type | R$^a$—⬡H—COO—⌬—⌬—X |
| 10 | Biphenyl ester type | R$^a$—⌬—⌬—COO—⌬—X |
| | | X—⌬—⌬—COO—⌬—R$^a$ |
| 11 | Thioester type | R$^a$—⌬—COS—⌬—X |
| 12 | Schiff type | R$^a$—⌬—CH=N—⌬—X |
| | | X—⌬—CH=N—⌬—R$^a$ |
| 13 | Pyrimidine type | R$^a$—⌬—(pyrimidine)—X |
| | | R$^a$—(pyrimidine)—⌬—X |
| | | R$^a$—⌬—(pyrimidine)—X |
| | | R$^a$—(pyrimidine)—⌬—X |
| 14 | Dioxane type | R$^a$—(dioxane)—⌬—X |
| 15 | Cyclohexyl methylether type | R$^a$—⬡H—CH$_2$O—⌬—X |

TABLE 1-continued

| No. | Type of Liquid Crystal | Example |
|---|---|---|
| | | $R^a$—⟨H⟩—CH$_2$O—⟨⟩—⟨⟩—X |
| 16 | Cinnamonitrile type | $R^a$—⟨H⟩—⟨⟩—CH=CH—X |
| 17 | Ethane type | $R^a$—⟨H⟩—CH$_2$CH$_2$—⟨⟩—X |
| | | $R^a$—⟨H⟩—CH$_2$CH$_2$—⟨⟩—⟨⟩—X |
| | | $R^a$—⟨H⟩—CH$_2$CH$_2$—⟨⟩—⟨H⟩—X |
| 18 | Dicyanophenyl ester type | $R^a$—⟨H⟩—COO—⟨⟩(CN)(CN)—OR$^b$ |
| | | $R^a$—⟨⟩—COO—⟨⟩(CN)(CN)—OR$^b$ |
| | | $R^a$—⟨H⟩—⟨⟩—COO—⟨⟩(CN)(CN)—OR$^b$ |
| | | $R^a$—⟨H⟩—COO—⟨⟩(CN)(CN)—COO—⟨H⟩—$R^a$ |

In the above Table 1, $R^a$ denotes an alkyl group or an alkoxy group; $R^b$ denotes an alkyl group; and X represents an alkyl group, an alkoxy group, a nitro group, a cyano group, or a halogen.

While the host liquid crystal substance to be used for the liquid crystal composition according to the present invention may be selected from any of those liquid crystals shown in Table 1 above or their mixtures, the liquid crystal produced and marketed by Merck & Co. under a tradename of "ZLI-1132"; the liquid crystal produced and marketed by Merck & Co. under a tradename of "ZLI-1565"; and the liquid crystal produced and marketed by British Drug House & Co. under a tradename of "E-7", are recommended as useful.

As the optically active substances to be used in the liquid crystal composition according to the present invention, there may be exemplified, chiral nematic compounds, for example, those compounds having optically active groups such as a 2-methylbutyl group, a 3-methylbutoxy group, a 3-methylpentyl group, a 3-methylpentoxy group, a 4-methylhexyl group, a 4-methylhexyloxy group, etc. introduced into the nematic liquid crystals; alcohol derivatives disclosed in Japanese Unexamined Patent Publication No. 45546/76 such as λ-menthol and d-borneol; ketone derivatives such as d-camphor and 3-methyl cyclohexane; carboxylic acid derivatives such as d-citronellic acid and λ-camphoric acid; aldehyde derivatives such as d-citronellal; alkene derivatives such as d-linonene; or other optically active substances such as amines, amides and nitrile derivatives.

As the elements for performing the liquid crystal display by use of the liquid crystal composition according to the present invention, there may be used known liquid crystal display elements. In more detail, transparent electrodes of any arbitrary patterns are formed on each of two sheets of glass substrates, at least one of which is transparent, and then these two sheets of glass substrates are arranged in parallel relationship such that the surface sides of the glass substrates, on which the electrodes have been formed, may be mutually opposed with appropriate spacers being interposed between them to construct the liquid crystal display element to be used. In this case, a space gap for the element is determined by the spacers. A preferred range of the space gap for the liquid crystal display element may be from 1 to 100 μm, or more preferably from 2 to 50 μm from the practical standpoint.

The azo type compounds for use in the present invention present violet to blue colors and feature high dichroic ratio and solubility in liquid crystals. Therefore, the liquid crystal composition of the present invention containing such compounds enable high-contrast color display not only in the blue range but also in black color when compounded with other pigments. In addition, the liquid crystal composition of the present invention is very useful in providing quick-response display.

In the following, the present invention will be explained more concretely in reference to practical examples, although the present invention is not restricted by these examples.

Here, explaining briefly about the order parameter S for indicating the dichroism, it can be empirically found on any dye from the following equation.

$$S = \frac{A\| - A\bot}{2A\bot + A\|}$$

In the above equation, $A\|$ and $A\bot$ respectively denote light absorbances of the dye with respect to light beams which have been polarized in parallel with and perpendicular to, respectively, the direction of orientation of the liquid crystal.

Specifically, the order parameter S is a value which indicates a display contrast of the guest-host type liquid crystal element, according to which the nearer this value comes theoretically to 1, the less becomes the degree of color remnant in the whitened portion, whereby a clear display of high brightness and contrast can be accomplished.

EXAMPLE 1-1

The azo type compound (dye) which is represented by the following formula:

was added to the afore-mentioned mixed liquid crystal ZLI-1565 (the tradename of the product of Merck & Co.), and the batch was heated to a temperature of 70° C. or higher, followed by agitating the same when it assumed a state of isotropic liquid, after which the mixture was left to cool. These process steps were repeated to well dissolve the above-mentioned compound (dye) into the liquid crystal.

The thus prepared liquid crystal composition according to the present invention was sealed into a space gap of 10 μm of an element composed of a pair of upper and lower glass substrates, each having a transparent electrode and been subjected to treatment, wherein the surface side of the glass substrate in contact with the liquid crystal was coated with a polyamide type resin, and cured, after which the resin was rubbed to have the homogeneous orientation. The above-mentioned liquid crystal within the element as treated for the above-mentioned homogeneous orientation took that homogeneous orientation when no electric voltage was applied to it, and the molecules of the dye also took the same orientation in accordance with the host liquid crystal.

The thus fabricated guest-host element was measured for its absorption spectrum by use of a light polarized in parallel with the direction of orientation of the liquid crystal molecules, and the light polarized vertically thereto, from which the maximum absorbing wavelength of the dye to each of these polarized lights were found. In finding out the absorbance of the dye, there was made corrections on the absorption by the host liquid crystal and the glass substrates as well as the reflection loss of the element.

Also, using the absorbances $A\|$ and $A\bot$ with respect to each of the polarized lights the values of the order parameter S were calculated based on the afore-mentioned equation of:

$$S = \frac{A\| - A\bot}{2A\bot + A\|}.$$

The results from the above calculation are shown in No. 1 of Table 2 below.

The azo type compound used in Example 1-1 was prepared by the following procedures: 5 g of 2-amino-5-(4'-n-butyl)phenylazothienothiazole was diazotized with 5.2 g of 43% nitrosyl sulfate at 0° C. in a mixed solvent consisting of N-methylpyrrolidone (100 ml), acetic acid (50 ml) and propionic acid (50 ml), and then subjected to coupling reaction with 2.2 g of N-ethyl-N-methylaniline at 0° C. The resulting azo type compound had a melting point of 239° to 240° C.

EXAMPLE 1-2

An azo type compound represented by the following formula:

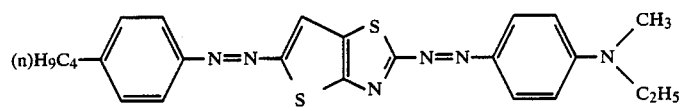

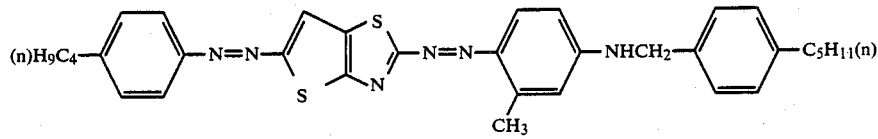

was processed as in Example 1-1 to fabricate a liquid crystal composition in guest-host element. The maximum absorption wavelength and order parameter (S) of the dye compound were measured and calculated as in Example 1-1. The results are shown in Table 2 under No. 2.

The azo type compound used in Example 1-2 was prepared as described in Example 1-1 except that N-ethyl-N-methylaniline was replaced by N-(p-n-pentylbenzyl)-3-methylaniline. This azo type compound had a melting point of 190° to 191° C.

EXAMPLES 1-3 TO 1-33

Azo type compounds (dyes) of the present invention having the structural formulas shown in Table 2 under Nos. 3 to 33 were prepared and isolated as in Example 1-1. The so prepared 31 dye compounds were processed as in Example 1-1 to fabricate liquid crystal compositions in guest-host element. The maximum absorption wavelengths (λmax) and order parameters (S) of the respective dye compounds were measured and calculated as in Example 1-1. The results are shown in Table 2 under Nos. 3 to 33.

TABLE 2

$$R^1 \!-\!\!\left(\!\!\boxed{A}\!\!-\!\!N\!=\!N\!\right)_{\!m}\!\!-\!\!\boxed{\begin{array}{c}S\phantom{xx}N\\ \phantom{x}\diagdown\phantom{x}\\ \phantom{xx}S\end{array}}\!\!-\!\!N\!=\!N\!-\!\!\boxed{C}\!\!-\!\!R^2 \quad (n=0)$$

| No. | R¹— | A | m | C | —R² | λmax (nm) | order.paramete (S) |
|---|---|---|---|---|---|---|---|
| 1 | (n)H₉C₄— | ⬡ | 1 | ⬡ | —N(CH₃)(C₂H₅) | 592 | 0.78 |
| 2 | (n)H₉C₄— | ⬡ | 1 | ⬡-CH₃ | —NHCH₂-⬡-C₅H₁₁(n) | 590 | 0.80 |
| 3 | H— | ⬡ | 1 | ⬡ | —N(CH₃)(C₂H₅) | 592 | 0.76 |
| 4 | (n)H₁₇C₈— | ⬡ | 1 | ⬡-CH₃ | —NHCH₂-⬡-C₃H₇(n) | 590 | 0.81 |
| 5 | CH₃CH₂CH(CH₃)— | ⬡ | 1 | ⬡ | —N(CH₃)(C₈H₁₇(n)) | 592 | 0.77 |
| 6 | (n)H₁₁C₅O— | ⬡ | 1 | ⬡ | —N(CH₃)(CH₂-⬡-C₆H₁₃(n)) | 598 | 0.79 |

TABLE 2-continued

Structure: R¹―(A)ₘ―N=N―[thiazole-S-thiazole]―N=N―C―R²  (n = 0)

| No. | R¹― | A | m | C | ―R² | λmax (nm) | order.parameter (S) |
|---|---|---|---|---|---|---|---|
| 7 | (n)H₁₅C₇O― | phenyl | 1 | 2-methylphenyl | ―NHCH₂―C₆H₄―C₂H₅ | 593 | 0.81 |
| 8 | (n)H₉C₄― | 2-methylphenyl | 1 | 2-methylphenyl | ―NHCH₂―C₆H₄―Cl | 592 | 0.78 |
| 9 | (n)H₉C₄― | phenyl | 2 | 2-methylphenyl | ―NHCH₂―C₆H₄―C₃H₇(n) | 593 | 0.82 |
| 10 | (n)H₁₇C₈―O― | phenyl | 2 | 2-methylphenyl | ―NHCH₂―C₆H₄―CH₃ | 593 | 0.82 |
| 11 | (n)H₉C₄―cyclohexyl(H)― | phenyl | 1 | 2-methyl-5-methoxyphenyl | ―NHCH₂―C₆H₄―C₄H₉(n) | 600 | 0.79 | see Note

TABLE 2-continued

Structure (n = 0):
$R^1-(A)_m-N=N-\text{(thiazole-thiazole)}-N=N-C-R^2$

| No. | $R^1-$ | A | m | C | $-R^2$ | λmax (nm) | order parameter (S) |
|---|---|---|---|---|---|---|---|
| 12 | (n)H₁₇C₈–(cyclohexyl, H)– | phenyl | 1 | phenyl | –NHCH₂–C₆H₄–OC₇H₁₅(n) | 595 | 0.78 |
| 13 | CH₃– | 2-Cl phenyl | 1 | 2-Cl phenyl | –NHCH₂–C₆H₄–C₈H₁₇(n) | 590 | 0.78 |
| 14 | (n)H₉C₄– | phenyl | 1 | 2-CH₃ phenyl | –N(CH₃)(C₂H₄OCH₃) | 588 | 0.79 |
| 15 | (n)H₁₅C₇– | 2-CH₃ phenyl | 1 | phenyl | –N(CH₃)(C₂H₄OC₄H₉(n)) | 592 | 0.78 |
| 16 | (n)H₉C₄– | phenyl | 1 | phenyl | –N(pyrrolidinyl) | 588 | 0.81 |

TABLE 2-continued

Structure: $R^1-(A)_m-N=N-[\text{thiazolo-thiazole}]-N=N-C-R^2$ (n = 0)

| No. | $R^1-$ | A | m | C | $-R^2$ | λmax (nm) | order.parameter (S) |
|---|---|---|---|---|---|---|---|
| 17 | (n)H₉C₄OH₄C₂—O— | phenyl | 1 | phenyl | morpholino (N-linked) | 590 | 0.80 |
| 18 | (n)H₉C₄—C₆H₄—CH₂O— | phenyl | 2 | 2-CH₃-phenyl | —NHCH₂—C₆H₄—C₄H₉(n) | 595 | 0.83 |
| 19 | (n)H₁₃C₆OCH₂— | phenyl | 1 | 2-CH₃-phenyl | —NHCH₂—C₆H₄—C₃H₇(n) | 590 | 0.80 |
| 20 | (n)H₇C₃—C₆H₄—CH₂CH₂— | phenyl | 1 | 2-CH₃-phenyl | —NHCH₂—C₆H₄—C₅H₁₁(n) | 590 | 0.81 |
| 21 | (n)H₁₅C₇O—C₆H₄—CH₂O— | phenyl | 1 | 2-CH₃-phenyl | —NHCH₂—C₆H₄—C₈H₁₇(n) | 593 | 0.82 |

TABLE 2-continued

Structure: R¹—(A)ₘ—[thiazole-thiazole]—N=N—(C)—N=N—C₆H₄—R² (n = 0)

| No. | R¹— | A | m | C | —R² | λmax (nm) | order.parameter (S) |
|---|---|---|---|---|---|---|---|
| 22 | (n)H₇C₃—O—C₆H₄—CH₂CH₂— | phenyl | 1 | 2-methylphenyl | —NHCH₂—C₆H₄—C₆H₁₃(n) | 590 | 0.81 |
| 23 | 4-Cl—C₆H₄—CH₂O— | phenyl | 2 | 2-methylphenyl | —NHCH₂—C₆H₄—C₅H₁₁(n) | 595 | 0.82 |
| 24 | (n)H₁₁C₅— | phenyl | 1 | naphthyl | —NHCH₂—C₆H₄—OC₇H₁₅(n) | 642 | 0.78 |
| 25 | (n)H₁₅C₇—cyclohexyl(H)— | phenyl | 1 | naphthyl | —NHCH₂—C₆H₄—C₄H₉(n) | 640 | 0.81 |

TABLE 2-continued

Structure (n = 0):
$R^1-(A)_m-N=N-\text{[thiazole-S-thiazole]}-N=N-C-R^2$

| No. | $R^1-$ | A | m | C | $-R^2$ | λmax (nm) | order.paramete (S) |
|---|---|---|---|---|---|---|---|
| 26 | (n)H₁₁C₅— | phenyl | 2 | quinoline | —NHCH₂—C₆H₄—C₃H₇(n) | 635 | 0.81 |
| 27 | (n)H₇C₃—cyclohexyl— | phenyl | 1 | quinoline | —NHCH₂—C₆H₄—OC₇H₁₅(n) | 635 | 0.81 |
| 28 | (n)H₉C₄— | phenyl | 2 | tetrahydronaphthalene | —NHCH₂—C₆H₄—C₄H₉(n) | 610 | 0.80 |
| 29 | (n)H₁₃C₆OOC— | phenyl | 2 | dimethylphenyl (CH₃) | —NHCH₂—C₆H₄—C₅H₁₁(n) | 607 | 0.81 |

TABLE 2-continued
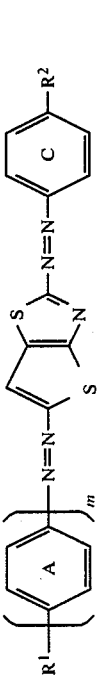
| No. | R¹— | A | m | C | —R² | λmax (nm) | order.parameter (S) |
|---|---|---|---|---|---|---|---|
| 30 | (n)C₁₁C₅–⌬–OOC– | ⌬ | 1 | –⌬–CH₃ | –N(C₂H₅)(CH₃) | 610 | 0.80 |
| 31 | (n)H₉C₄–H–OOC– | ⌬ | 1 | –⌬– | –N(C₇H₁₅(n))(CH₃) | 608 | 0.81 |
| 32 | (n)H₁₅C₇– | ⌬ | 2 | –⌬(CH₃)(CH₃)– | –NHCH₂–⌬–C₆H₁₃(n) | 612 | 0.81 |
| 33 | (n)H₁₅C₇O–⌬– | ⌬ | 1 | –⌬–CH₃ | –NHCH₂–⌬–C₆H₁₃(n) | 592 | 0.78 |
Note:  denotes a trans-form.

EXAMPLE 2-1

An azo type compound represented by the following structural formula:

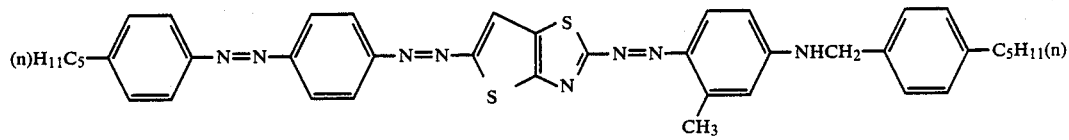

was processed as in Example 1-1 to fabricate a liquid crystal composition in guest-host element. The maximum absorption wavelength and order parameter (S) of the compound were measured and calculated as in Example 1-1. The results shown in Table 3 under No. 1.

The azo type compound used in Example 2-1 was prepared by the following procedures: 4.4 g of 2-amino-5-[4″-(4′-n-pentyl)phenylazo]phenylazothienothiazole was diazotized with 3.5 g of 43% nitrosyl sulfate at 0° C. in a mixed solvent consisting of phosphoric acid (200 ml) and acetic acid (40 ml), and then subjected to coupling reaction with 26.5 g of N-(p-n-pentylbenzyl)-3-methylaniline at 0° C. The resulting azo type compound had a melting point of 198° to 199° C. Molecular extension coefficient measurement in chloroform gave a value of $6.50 \times 10^4$. This shows that the azo type compound of the present invention which was prepared in Example 2-1 had a very great coloring power and needed to be incorporated in only a small amount when preparing a desired liquid crystal composition.

EXAMPLE 2-2

An azo type compound represented by the formula:

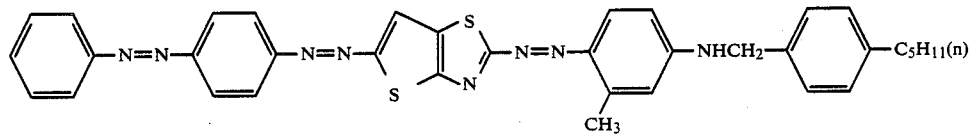

was processed as in Example 1-1 to fabricate a liquid crystal composition in guest-host element. The maximum absorption wavelength and order parameter (S) of the compound were measured and calculated as in Example 1-1. The results are shown in Table 3 under No. 2.

The azo type compound used in Example 2-2 was prepared as described in Example 2-1 except that 2-amino-5-[4″-(4′-n-pentyl)phenylazo]phenylazothienothiazole was replaced by 2-amino-5-(4′-phenylazo)-phenylazothienothiazole. This azo type compound had a melting point of 213° to 214° C.

Molecular extinction coefficient measurement of the dye compound in chloroform gave a value of $7.6 \times 10^4$, indicating the great coloring power of this azo type compound.

EXAMPLES 2-3 to 2-31

Azo type compounds (dyes) of the present invention having the structural formulas shown in Table 3 under Nos. 3 to 31 were prepared and isolated as in Example 1-1. The so prepared 29 dye compounds were processed as in Example 1-1 to fabricate liquid crystal compositions in guest-host element. The maximum absorption wavelengths (λmax) and order parameters (S) of the respective compounds were measured and calculated as in Example 1-1. The results are shown in Table 3 under Nos. 3 to 31.

TABLE 3

$R^1\text{-}(A)_m\text{-}N=N\text{-}B\text{-}N=N\text{-}\underset{S}{\text{thiazole}}\text{-}C\text{-}R^2$

| No. | $R^1\text{-}(A)_m$ | B | C-$R^2$ | λmax (nm) | order·parameter (S) |
|---|---|---|---|---|---|
| 1 | (n)H₁₁C₅—⌬— | —⌬— | NHCH₂—⌬(CH₃)—C₅H₁₁(n) | 605 | 0.80 |
| 2 | —⌬— | " | " | 611 | 0.77 |
| 3 | (n)H₇C₃—⌬— | " | " | 605 | 0.80 |
| 4 | (n)H₁₅C₇—⌬— | " | NHCH₂—⌬(CH₃)—C₃H₇(n) | 605 | 0.81 |
| 5 | (n)H₇C₃—⌬—CH₂CH₂—⌬— | " | " | 605 | 0.82 |
| 6 | (n)H₉C₄O—⌬— | " | NHCH₂—⌬(CH₃)—OC₄H₉(n) | 613 | 0.80 |

TABLE 3-continued

Structure: R¹—(A)ₘ—N=N—B—N=N—(thiazole-thiazole)—C—R²

| No. | (A)ₘ with R¹ | B | C with R² | λmax (nm) | order parameter (S) |
|---|---|---|---|---|---|
| 7 | (n)H₁₇C₈O—⌬— | 2,6-dimethyl with OCH₃ (phenyl with OCH₃ and CH₃) | —⌬—NHCH₂—⌬—OC₄H₉(n), with CH₃ | 615 | 0.78 |
| 8 | H₅C₂OCH₂CH₂O—⌬— | —⌬— | —⌬—N(CH₃)(CH₂—⌬—C₄H₉(n)) | 615 | 0.80 |
| 9 | —⌬— (phenyl with CH₃) | ″ | —⌬—N(CH₃)(C₂H₅) | 599 | 0.81 |
| 10 | (n)H₉C₄—⌬—⌬— | ″ | —⌬—N(CH₃)(CH₂CH₂OCH₃) | 600 | 0.83 |
| 11 | (n)H₇C₃—(H)—⌬— | ″ | —⌬—N(CH₃)(CH₂CH₂OC₄H₉(n)) | 600 | 0.83 |

(see Note)

TABLE 3-continued

Structure: R¹—(A)ₘ—N=N—B—N=N—(thiazole-S)—(thiazole-S)—N=N—C—R²

| No. | R¹−(A)ₘ− | B | C−R² | λmax (nm) | order·parameter (S) |
|---|---|---|---|---|---|
| 12 | (n)H₉C₄—C₆H₄—OCH₂— | 2-CH₃-C₆H₄ | 4-(pyrrolidin-1-yl)-C₆H₄ | 610 | 0.80 |
| 13 | H₁₃C₆OCH₂—C₆H₄— | 2-Cl-C₆H₄ | 4-(morpholin-4-yl)-C₆H₄ | 610 | 0.78 |
| 14 | (n)H₉C₄—(2-CH₃-C₆H₃)— | naphthyl | 3-CH₃-4-[NHCH₂-C₆H₄-C₃H₇(n)]-C₆H₃ | 600 | 0.80 |
| 15 | CH₃—(3-Cl-C₆H₃)— | quinolinyl | 3-CH₃-4-[NHCH₂-C₆H₄-C₃H₇(n)]-C₆H₃ | 630 | 0.79 |

TABLE 3-continued

| No. | A | B | C | R² | λmax (nm) | order·parameter (S) |
|---|---|---|---|---|---|---|
| 16 | 4-Cl-C₆H₄-CH₂O-C₆H₄- | C₆H₄ | 3-Cl-4-(NHCH₂-C₆H₄-C₃H₇(n))-C₆H₃ | | 615 | 0.79 |
| 17 | 4-(n-C₄H₉)-C₆H₄- | C₆H₄ | 4-(NHCH₂-C₆H₄-C₂H₅)-naphthyl | | 655 | 0.80 |
| 18 | 4-(n-C₇H₁₅O)-C₆H₄- | C₆H₄ | 4-(NHCH₂-C₆H₄-C₄H₉(n))-quinolinyl | | 650 | 0.79 |
| 19 | 4-cyclohexyl-C₆H₄- | C₆H₄ | 3-OCH₃-4-(NHCH₂-C₆H₄-C₅H₁₁(n))-C₆H₃ | | 612 | 0.79 |

TABLE 3-continued

[Structure: R¹—(A)ₘ—N=N—B—N=N—(thiazole-thiazole)—N=N—C—R²]

| No. | R¹―(A)ₘ― | B | ―C―R² | λmax (nm) | order·parameter (S) |
|---|---|---|---|---|---|
| 20 | (n)H₁₁C₅OOC—C₆H₄— | C₆H₄ | 4-Cl, 3-CH₃-C₆H₃—NHCH₂— | 620 | 0.82 |
| 21 | (n)H₉C₄OCH₂CH₂OOC—C₆H₄— | tetralin (H) | 4-C₃H₇(n), 3-CH₃-C₆H₃—NHCH₂— | 625 | 0.81 |
| 22 | (n)H₇C₃—C₆H₁₀(H)—OOC—C₆H₄— | C₆H₄ | 4-CH₃-C₆H₄—N(CH₃)(C₄H₉(n))— | 615 | 0.82 |
| 23 | (n)H₉C₄—C₆H₄—OOC—C₆H₄— | C₆H₄ | 4-CH₃-C₆H₄—N(CH₃)(C₆H₁₃(n))— | 615 | 0.82 |
| 24 | (n)H₁₁C₅O—C₆H₄—OOC—C₆H₄— | C₆H₄ | 4-OC₃H₇(n), 3-CH₃-C₆H₃—NHCH₂— | 620 | 0.82 |

TABLE 3-continued

| No. | R¹-(A)ₘ- | B | C-R² | λmax (nm) | order·parameter (S) |
|---|---|---|---|---|---|
| 25 | (n)H₉C₄—⟨phenyl⟩—COO—⟨phenyl⟩— | ⟨phenyl⟩ | ⟨5,6,7,8-tetrahydronaphthyl⟩—NHCH₂—⟨phenyl⟩—C₄H₉(n) | 622 | 0.80 |
| 26 | H₅C₂—⟨phenyl⟩— | ⟨2,3-dimethylphenyl⟩ | ⟨phenyl⟩—NHCH₂—⟨phenyl⟩—C₈H₁₇(n) | 603 | 0.80 |
| 27 | (n)H₁₇C₈—⟨phenyl⟩— | ⟨2,5-dimethylphenyl⟩ | ⟨3-methylphenyl⟩—N(CH₃)—C₈H₁₇(n) | 610 | 0.81 |
| 28 | (n)H₁₅C₇—⟨cyclohexyl⟩—⟨phenyl⟩— | ⟨phenyl⟩ | ⟨2,3-dimethylphenyl⟩—NHCH₂—⟨phenyl⟩—OC₇H₁₅(n) | 609 | 0.83 |

TABLE 3-continued
| No. | R¹–(A)ₘ | B | C–R² | λmax (nm) | order·parameter (S) |
|---|---|---|---|---|---|
| 29 | (n)H₁₅C₇–⟨biphenyl⟩– | ⟨phenyl⟩ | ⟨phenyl⟩–NHCH₂–⟨phenyl(CH₃)⟩–C₄H₉(n) | 607 | 0.83 |
| 30 | (n)H₁₁C₅–O–⟨biphenyl⟩– | ⟨phenyl-CH₃⟩ | ⟨phenyl⟩–NHCH₂–⟨phenyl(CH₃)⟩–C₄H₉(n) | 612 | 0.83 |
| 31 | (n)H₁₁C₅O–⟨phenyl⟩– | ⟨phenyl⟩ | ⟨phenyl⟩–NHCH₂–⟨phenyl(CH₃)⟩–C₅H₁₁(n) | 610 | 0.80 |
(Note: 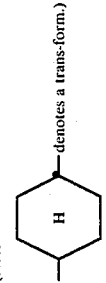 denotes a trans-form.)

While the invention has been described in detail and with reference to specific embodiments thereof, it will be apparent to one skilled in the art that various changes and modifications can be made therein without departing from the spirit and scope thereof.

What is claimed is:

1. A liquid crystal composition suitable for a guest-host liquid crystal device comprising a solution of a liquid crystal substance and a pleochroic dye, said pleochroic dye comprising at least one azo type compound having the formula (I),

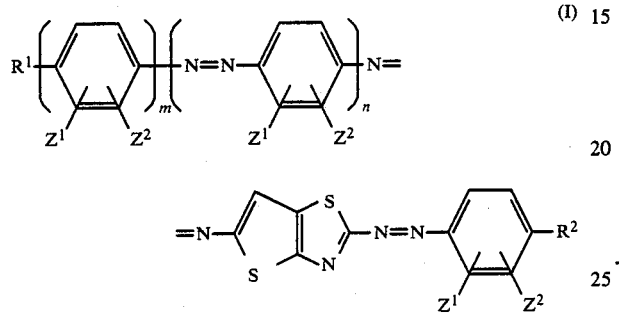

wherein $R^1$ represents a hydrogen atom; an alkyl radical having 1 to 3 carbon atoms substituted with a phenyl radical which is substituted by a member of the group consisting of an alkyl radical having 1 to 8 carbon atoms, an alkoxy radical having 1 to 8 carbon atoms and, a chlorine atom; an alkyl radical having 1 to 8 carbon atoms which may be substituted by an alkoxy radical having 1 to 8 carbon atoms; an alkoxy radical having 1 to 3 carbon atoms substituted by a phenyl radical which is substituted by a member of the group consisting of an alkyl radical having 1 to 8 carbon atoms, an alkoxy radical having 1 to 8 carbon atoms and a chlorine atom; an alkoxy radical having 1 to 8 carbon atoms which may be substituted by an alkoxy radical having 1 to 8 carbon atoms; a cyclohexyl group which may be substituted by either an alkyl radical having 1 to 8 carbon atoms or —COOR$^3$, wherein $R^3$ represents an alkyl radical having 1 to 8 carbon atoms which may be substituted by an alkoxy radical having 1 to 8 carbon atoms; a cyclohexyl radical substituted by an alkyl radical having 1 to 8 carbon atoms; a phenyl radical substituted by an alkoxy radical having 1 to 8 carbon atoms; or a phenyl radical substituted by an alkyl radical having 1 to 8 carbon atoms,

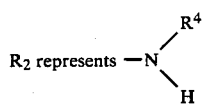

wherein $R^4$ represents an alkyl radical having 1 to 3 carbon atoms, optionally substituted by a phenyl radical which is substituted by a substituent selected from the group consisting of an alkyl radical having 1 to 8 carbon atoms, an alkoxy radical having 1 to 8 carbon atoms, or a chlorine atom; or

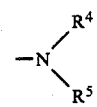

wherein $R^{4'}$ represents an alkyl radical having 1 to 8 carbon atoms, and $R^5$ represents an alkyl radical having 1 to 8 carbon atoms, or an alkyl radical having 1 to 3 carbon atoms substituted by a phenyl radical which is substituted by an alkyl radical having 1 to 8 carbon atoms, $R^{4'}$ and $R^5$ being optionally connected to form

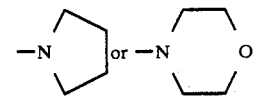

$Z^1$ and $Z^2$ each represent a hydrogen atom, a chlorine atom, an alkyl radical having 1 to 3 carbon atoms, or an alkoxy radical having 1 to 3 carbon atoms, or $Z^1$ and $Z^2$ are connected to form a fused ring of the formula:

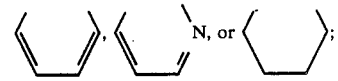

m is 1 or 2; and n is 0 or 1.

2. A liquid crystal composition as claimed in claim 1 wherein the azo type compound is represented by the following general formula (II):

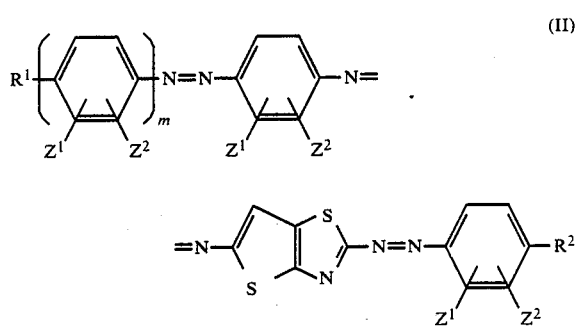

where $R^1$, $R^2$, $Z^1$, $Z^2$ and m are the same as defined in the general formula (I).

3. A liquid crystal composition as claimed in claim 1 wherein the azo type compound is represented by the following general formula (III):

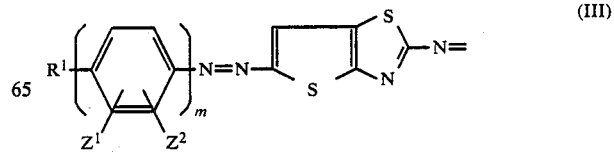

-continued

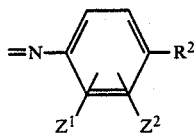

where $R^1$, $R^2$, $Z^1$, $Z^2$ and m are the same as defined in the general formula (I).

4. A liquid crystal composition as claimed in claim 1 wherein the azo type compound is represented by the following general formula (IV):

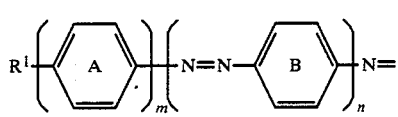

(IV)

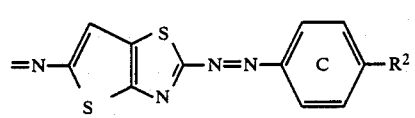

where $R^1$, $R^2$, m and n are the same as defined in the general formula (I);

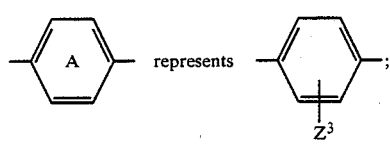 represents 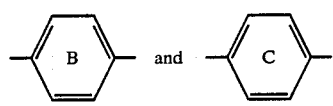;

—⟨ B ⟩— and —⟨ C ⟩— each represents

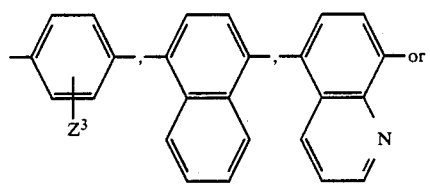

and $Z^3$ represents a hydrogen atom or an alkyl radical.

5. A liquid crystal composition as claimed in claim 4, wherein $R^1$ represents a hydrogen atom; an alkyl radical having 1 to 8 carbon atoms; an alkyl radical having 1 to 8 carbon atoms substituted by an alkoxy radical having 1 to 8 carbon atoms; or an alkoxy radical having 1 to 3 carbon atoms substituted by a phenyl radical which is substituted by a substituent selected from the group consisting of an alkyl radical having 1 to 8 carbon atoms, an alkoxy radical having 1 to 8 carbon atoms, and a chlorine atom; or a cyclohexyl group optionally substituted by an alkyl radical having 1 to 8 carbon atoms; and $Z^3$ represents a hydrogen atom or a methyl radical.

6. A liquid crystal composition as claimed in claim 4, wherein

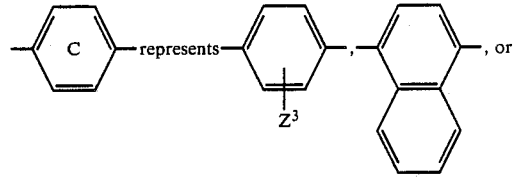

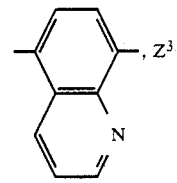, $Z^3$ being the same as defined in claim 4.

7. A liquid crystal composition as claimed in claim 4, wherein

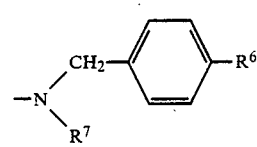

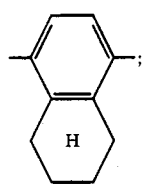

being the same as defined in claim 4.

8. A liquid crystal composition as claimed in claim 4, wherein $R^1$ represents an alkyl radical having 1 to 8 carbon atoms or a 4-alkylcyclohexyl radical, $R^2$ represents

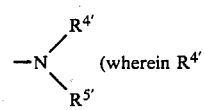

wherein $R^6$ represents an alkyl radical having 1 to 8 carbon atoms, or an alkoxy radical having 1 to 8 carbon atoms, and $R^7$ represents a hydrogen atom, or —N⟨ $R^{4'}$ / $R^{5'}$ (wherein $R^{4'}$ represents an alkyl radical having 1 to 3 carbon atoms, and $R^{5'}$ represents an alkyl radical having 1 to 8 carbon atoms,

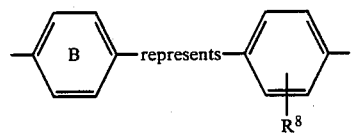

wherein $R^8$ represents a hydrogen atom or a methyl radical, or

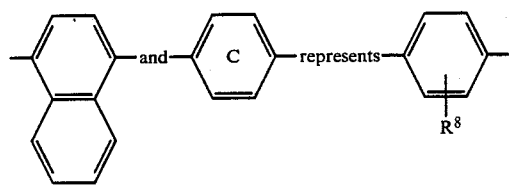

wherein $R^8$ in the same as defined above,

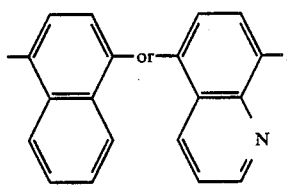

9. The composition of claim 4 wherein m in Formula (IV) is 1, and $R^1$ is an alkyl radical having 1 to 8 carbon atoms.

10. The composition of claim 4 wherein m in Formula (IV) is 2, and $R^1$ is an alkyl radical having 1 to 8 carbon atoms.

11. The composition of claim 6 wherein

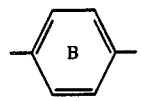

in Formula (IV) is

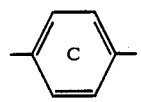

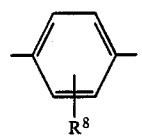

wherein $R^8$ is hydrogen or methyl.

12. A liquid crystal composition as claimed in claim 6 wherein

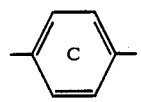

in Formula (IV) is

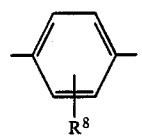

wherein $R^8$ is hydrogen or methyl.

13. A liquid crystal composition as claimed in claim 4 wherein n in the general formula (IV) for the azo type compound is 1.

* * * * *